(12) United States Patent
Hao (10) Patent No.: US 12,527,504 B2
(45) Date of Patent: Jan. 20, 2026

(54) CAPILLARY BLOOD COLLECTING DEVICE

(71) Applicant: Yunling Hao, Guangdong (CN)

(72) Inventor: Yunling Hao, Guangdong (CN)

( * ) Notice: Subject to any disclaimer, the term of this patent is extended or adjusted under 35 U.S.C. 154(b) by 873 days.

(21) Appl. No.: 17/788,088

(22) PCT Filed: Dec. 26, 2019

(86) PCT No.: PCT/CN2019/128618
§ 371 (c)(1),
(2) Date: Jun. 22, 2022

(87) PCT Pub. No.: WO2021/128154
PCT Pub. Date: Jul. 1, 2021

(65) Prior Publication Data
US 2023/0041849 A1    Feb. 9, 2023

(51) Int. Cl.
*A61B 5/151* (2006.01)
*G01N 33/48* (2006.01)

(52) U.S. Cl.
CPC .............. *A61B 5/151* (2013.01); *G01N 33/48* (2013.01)

(58) Field of Classification Search
CPC ........ A61B 5/150022; A61B 5/150068; A61B 5/150358; A61B 5/150412; A61B 5/150748; A61B 5/151; A61B 5/15113; A61B 5/15117; A61B 5/1519; A61B 5/157; G01N 33/48
See application file for complete search history.

(56) References Cited

U.S. PATENT DOCUMENTS

| | | | |
|---|---|---|---|
| 2004/0030353 A1* | 2/2004 | Schmelzeisen-Redeker | ............... A61B 5/150389 600/573 |
| 2005/0234486 A1* | 10/2005 | Allen | ............... A61B 5/150061 606/181 |
| 2009/0112125 A1* | 4/2009 | Tamir | ............... A61B 5/150022 600/583 |
| 2010/0063417 A1* | 3/2010 | List | .................... A61B 5/15132 600/583 |

(Continued)

FOREIGN PATENT DOCUMENTS

| | | |
|---|---|---|
| CN | 1994226 A | 7/2007 |
| CN | 203122422 U | 8/2013 |

(Continued)

OTHER PUBLICATIONS

International Search Report issued in corresponding International Application No. PCT/CN2019/128618 dated Oct. 10, 2020, pp. 1-3, English Translation.

*Primary Examiner* — Alex M Valvis
*Assistant Examiner* — Anna Roberts
(74) *Attorney, Agent, or Firm* — Birchwood IP (57) ABSTRACT

The present disclosure relates to a capillary blood collecting device which includes a fixing device including an accommodating cavity for accommodating a blood collection finger and a squeezing member for squeezing blood to a fingertip site. The capillary blood collecting device is configured to detachably accommodate at least one skin puncture part on a blood collection side of the finger, and the skin puncture part includes a blood lancet that may be driven to puncture the blood collection finger, such that a sufficient amount of capillary blood quickly flows out from the capillary blood converged at the fingertip under the action of blood lancet.

17 Claims, 7 Drawing Sheets

(56) References Cited

U.S. PATENT DOCUMENTS

2014/0221802 A1 8/2014 Choi
2016/0345884 A1* 12/2016 Tanaka ............. A61B 5/150259

FOREIGN PATENT DOCUMENTS

| CN | 206499468 U | 9/2017 |
|---|---|---|
| CN | 107708560 A | 2/2018 |
| CN | 108375671 A | 8/2018 |
| JP | 2005278740 A | 10/2005 |

* cited by examiner

CAPILLARY BLOOD COLLECTING DEVICE

CROSS REFERENCE TO RELATED APPLICATIONS

The present application is a national stage application of International Application No. PCT/CN2019/128618, filed Dec. 26, 2019, the entire contents of which is hereby incorporated by reference herein in its entirety.

TECHNICAL FIELD

The present disclosure relates to the technical field of medical equipment, and in particular to a capillary blood collecting device.

BACKGROUND

Diabetes, hyperlipidemia, hyperuricemia and other diseases are caused by metabolic disorders. As to the treatment principles for these diseases, a standard drug treatment and close monitoring of the patient's condition are more important than physical exercise and reasonable diet. Taking the diabetes as an example, blood glucose monitoring is essential for the treatment of diabetes. Whether the treatment plan for lowering blood glucose is reasonable, whether the dose of the drug is appropriate, whether the drug needs to be adjusted and how to adjust it, etc., all depend on blood glucose monitoring. If the blood glucose is not monitored, it will be blind when taking the drug. Particularly, if the blood glucose lasts high for a long time period, then it will lead to the gradual increase of cardiovascular and cerebrovascular complications and thus gradual deterioration of the quality of life. Besides, if the blood glucose is too low, it will be even life-threatening. Therefore, it is particularly important to monitor biochemical indicators such as blood glucose during treatment.

At present, the most commonly used capillary blood collection method is to obtain capillary blood by puncturing a fingertip and then squeezing the finger. However, nerve endings are densely distributed at the fingertip of the finger, which causes a strong pain sensation during blood collection. Many patients may not follow doctor's orders for regular monitoring due to the pain of blood collection. In addition, due to improper operation of puncturing by the patient during capillary blood collection, there is little or even no blood flow out of the skin after it is punctured by a needle. In this manner, then the patient needs to squeeze the skin with the other hand. If the finger is squeezed to excessive extent, then the bleeding blood will contain tissue fluid, making the measurement inaccurate with increased pain.

SUMMARY

In view of the above-mentioned technical problems in the prior art, the present disclosure provides a capillary blood collecting device, which not only reduces the complexity of monitoring the condition by the user, but also relieves the pain of a blood collection finger and people's fear sensation.

In accordance with a first aspect of present disclosure, it provides a capillary blood collecting device. The capillary blood collecting device may comprise a fixing device, which includes an accommodating cavity for accommodating a finger for which blood-collection is to be performed. The fixing device may be provided with a squeezing member for squeezing blood to a fingertip site. The capillary blood collecting device may be configured to detachably accommodate at least one skin puncture part on a side of the finger from which blood collection is to be performed. And the skin puncture part may include a blood lancet that are drivable to puncture the finger.

In some embodiments, the capillary blood collecting device may be configured to detachably accommodate a test strip, which is provided with a capillary blood collection tube on one side and is accommodated in or deliverable to the vicinity of a puncturing position of the finger, so as to aspirate blood.

In some embodiments, the capillary blood collecting device may further comprise a skin puncture part and a test strip. The test strip may be provided with a capillary blood collection tube on one side and is accommodated in the vicinity of a puncturing position inside the skin puncture part, so as to aspirate blood. Besides, the test strip may be provided with a conductive contact on the other side outside the skin puncture part, so as to be electrically connected to a test device.

In some embodiments, a part of the test strip provided with the capillary blood collection tube may be encapsulated inside the skin puncture part.

In some embodiments, the capillary blood collecting device may be provided with a tray for supporting the finger. A limiting mechanism may be provided in the tray, so as to limit the placement position and depth of the finger.

In some embodiments, the squeezing member may have compliance, so that its shape is adapted to the contour of a finger.

In some embodiments, the squeezing member is provided in the fixing device, and the capillary blood collecting device may further include a block member provided in the fixing device. The block member may be away from the skin puncture part with respect to the squeezing member, so as to prevent blood in the finger from flowing back to the finger root upon pressurization by the squeezing member. The capillary blood collecting device may further include an actuating mechanism, which is configured to actuate the block member first to pressurize the root of a finger, and then actuate the squeezing member to perform squeezing.

In some embodiments, the capillary blood collecting device may be configured to detachably accommodate a measurement device. The test strip may be provided with a conductive contact at one end away from the blood lancet. And the conductive contact may be electrically connected to the measurement device, so as to obtain a test result based on blood on the test strip.

In some embodiments, the capillary blood collecting device may further include a measurement device. The conductive contact may be electrically connected to the measurement device, so as to obtain a test result based on blood on the test strip.

In some embodiments, a blood collection port, through which the blood lancet pass, may be opened in a lower part of the skin puncture part, and the blood collection port is set at deviation to left/right position of the finger on its blood-collection side.

In some embodiments, the capillary blood collecting device may further include a blood volume detection sensor and a micro-processing unit. The blood volume detection sensor may be configured to detect a bleeding volume of the finger after puncturing. The micro-processing unit may be configured to send a pressure release signal to the squeezing member when the bleeding volume reaches a first threshold.

In some embodiments, the capillary blood collecting device may be provided with an observation window for observing a bleeding volume of the finger.

In some embodiments, the capillary blood collecting device may further include a prompt device. The prompt device may be connected to the measurement device and configured to deliver prompt information based on the test result.

In some embodiments, the prompt device may include at least one or more of a visual prompt assembly and an audible prompt assembly.

In some embodiments, the capillary blood collecting device may further include a pressure release button, which is electrically connected to the squeezing member so as to release the pressure applied by the squeezing member.

In some embodiments, the capillary blood collecting device may further include a pressure sensor and a micro-processing unit. The pressure sensor may be configured to monitor a pressure value applied by the squeezing member. The micro-processing unit may be configured to send a pressurization stop signal to the squeezing member when the pressure value reaches a second threshold value.

In some embodiments, the skin puncture part may further comprise a driving device for driving the blood lancet to puncture the finger.

Compared with the prior art, the embodiment of the present disclosure has the following advantages. The finger is accommodated by the fixing device, and by means of a squeezing member provided on the fixing device, the finger may be pressurized firstly so as to squeeze (pressurize and push) the blood of the finger to the fingertip site, without manual squeezing operation by a user, which is convenient for the user. Further, a skin puncture part may be accommodated into the capillary blood collecting device. By means of driving the blood lancet of the skin puncture part, the puncturing action may be automatically completed, and thus a sufficient amount of capillary blood, which has already converged at the fingertip site, may quickly flows out under the action of blood lancet. In this manner, it eliminates the need for a series of operations, such as manually kneading fingers, puncturing, and then squeezing fingers to collect blood, as in the traditional fingertip blood collection method. It may greatly reduce the complexity of the blood collection procedure, reduce the patient's psychological fear and physical pain, and avoid squeezing out tissue fluid that would affect the measurement results.

BRIEF DESCRIPTION OF THE DRAWINGS

In figures that are not necessarily drawn to scale, the same reference signs may describe similar members in different figures. The same reference signs with suffixes or different suffixes may denote different examples of similar members. The figures generally show various embodiments by way of example rather than limitation, and are used together with the description and claims to describe the embodiments of the present disclosure. When appropriate, the same reference signs are used in all figures to refer to the same or similar parts. Such embodiments are illustrative, and are not intended to be exhaustive or exclusive embodiments of the present device or method.

FIG. 1 illustrates a schematic structural diagram of a capillary blood collecting device according to an embodiment of the present disclosure after the finger for which blood collection is to be performed is put in;

FIG. 2 illustrates a first structural schematic diagram of a capillary blood collecting device according to an embodiment of the present disclosure before the finger for which blood collection is to be performed is put in;

FIG. 3 illustrates a second structural schematic diagram of the capillary blood collecting device according to the embodiment of the present disclosure before the finger is put in;

FIG. 4 illustrates a first cross-sectional view of the capillary blood collecting device according to the embodiment of the present disclosure after the finger is put in;

FIG. 5 illustrates a second cross-sectional view of the capillary blood collecting device according to the embodiment of the present disclosure after the finger is put in;

Members denoted by reference numerals in the figures:
100—fixing device; 1—first body; 101—first groove; 102—tray; 103—limiting mechanism; 104—unlocking button; 105—first bayonet coupling; 2—second body; 201—second groove; 202—blood collection port; 203—pressure release button; 204—second bayonet coupling; 3—finger; 4—squeezing member; 5—skin puncture part; 501—needle; 6—test strip; 601—capillary blood collection tube; 602—conductive contact; 7—first block member; 8—second block member; 9—observation window; 10—prompt device; 11—measurement device; 12—blood volume detection sensor.

DETAILED DESCRIPTION

In order to enable those skilled in the art to better understand the technical solutions of the present disclosure, the present disclosure will be described in details below in conjunction with the accompanying drawings and specific embodiments. The embodiments of the present disclosure will be described in further details below in conjunction with the accompanying drawings and specific embodiments, but they are not intended to limit the present disclosure.

"First", "second" and similar words used in the present disclosure do not indicate any order, quantity or importance, but are only used to distinguish different members. "Include" or "comprise" and other similar words means that an element appearing before this word covers an element listed after this word, but do not exclude other elements. "Up", "down", "left", "right", etc. are only used to indicate the relative position relationship. When the absolute position of a described object changes, the relative position relationship may also change accordingly.

In the present disclosure, when it is described that a specific device is located between the first device and the second device, there may or may not be an interposed device between the specific device and the first device or the second device. When it is described that a specific device is coupled to another device, the specific device may be directly coupled to the other device without an interposed device, or may not be directly coupled to the other device but with an interposed device.

All terms (including technical terms or scientific terms) used in this disclosure have the same meaning as understood by those of ordinary skill in the art to which this disclosure belongs, unless otherwise specifically defined. It should also be understood that terms such as those defined in general-purpose dictionaries should be interpreted as having meanings consistent with their meanings in the context of related technologies, and should not be interpreted in an idealized or extremely formal sense unless it is clearly defined as such herein.

The technologies, methods, and devices known to those of ordinary skill in the relevant fields may not be discussed in details, but where appropriate, the technologies, methods, and devices should be regarded as a part of the specification.

An embodiment of the present disclosure provides a capillary blood collecting device. As shown in FIGS. 1 to 5, the capillary blood collecting device includes a fixing device 100 which includes an accommodating cavity for accommodating a finger 3, for which blood collection is to be performed. A user may put the finger 3 in the accommodating cavity for blood collection.

Figure 1:
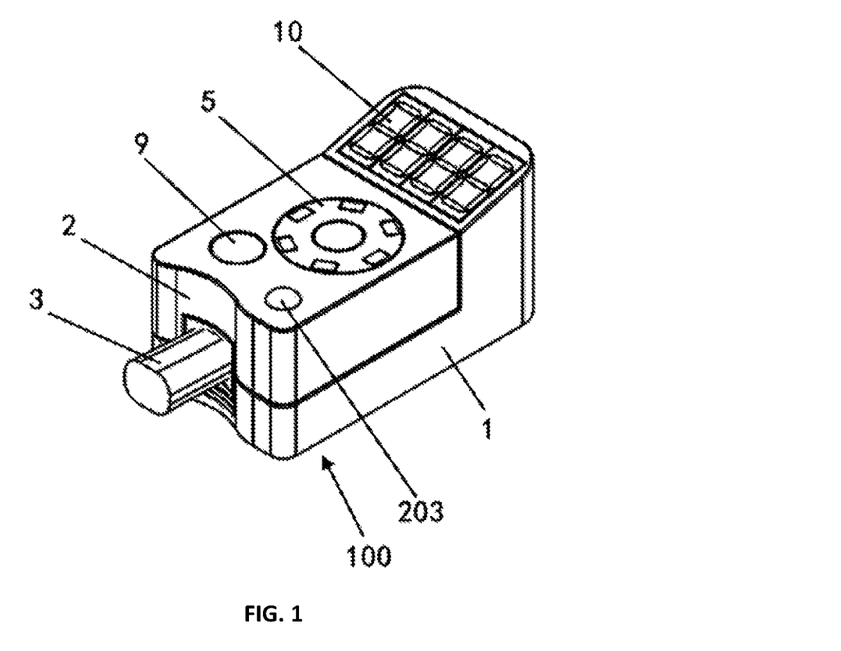

It can be understood that, the above-mentioned fixing device 100 may adopt an integrated design or a detachable design. When the above-mentioned fixing device 100 adopts the integrated design, the fixing device 100 may include an integrated body in a cylindrical shape, a square shape, etc., and the above-mentioned accommodating cavity is provided therein to accommodate the finger 3. The present application does not specifically limit the shape of the body of the fixing device 100. When the above-mentioned fixing device 100 adopts the detachable design, the above-mentioned fixing device 100 may include a first body 1 and a second body 2 as shown in FIG. 1. The first body 1 and the second body 2 are pivotally connected to the together, and they are engaged with each other to form the above-mentioned accommodating cavity for accommodating the finger 3. Wherein, the first body 1 may be provided with a first groove 101 thereon, and the second body 2 may be provided with a second groove 201 thereon; the first groove 101 and the second groove 201 have curvatures suitable for the outer contour surface of a human finger, so that the finger 3 can fit against the inner surfaces of the first groove 101 and the second groove 201.

Hereinafter, the operation flow will be explained by taking the fixing device 100 including the above-mentioned first body 1 and the second body 2 as an example. However, it should be noted that other designs of the fixing device 100 are also possible, as long as the operation flow is adjusted accordingly, which will not be repeated here. When using the capillary blood collecting device, the first body 1 or the second body 2 can be placed on the operation platform for operation. As an example, when the first body 1 is placed on the operation platform for operation, the second body 2 is rotated away from the first body 1 so that the user can place the finger 3 in the accommodating cavity, and then is clamped to the first body 1 for blood collection. In the following and in the accompanying drawings, the first body 1 is placed on the operating platform as an example for description and illustration, but the present application is not limited to this.

Further, the fixing device 100 is provided with a squeezing member 4 for squeezing the blood to the fingertip site. After the finger 3 is placed into the accommodating cavity, the above-mentioned squeezing member 4 may be driven to pressurize toward the blood collection surface of the finger 3, so as to replace the manual squeezing in the current operation. The above-mentioned squeezing member 4 may adopt a squeezing plate, a squeezing airbag or other technical means, as long as a squeezing force can be appropriately applied to the finger 3. By means of the squeezing operation by the squeezing member 4 in advance to puncture, it can avoid the situation in the prior art that the finger needs to be squeezed for several times in a repeated manner to obtain a sufficient amount of capillary blood, otherwise the bleeding volume may be insufficient. Besides, it may avoid the situation that the squeezed-out blood contains tissue fluid, so as to further ensure the accuracy of the measurement result, thereby improving the accuracy of the capillary blood collecting device.

Figure 5:
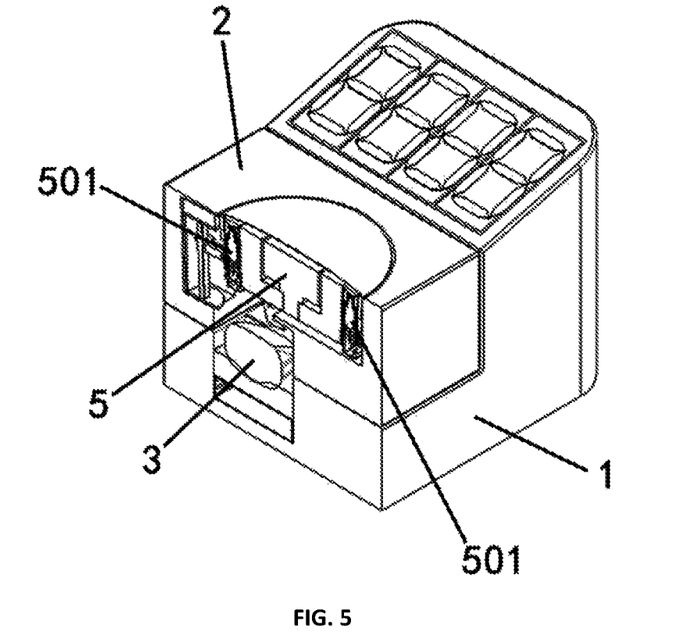
Figure 6:
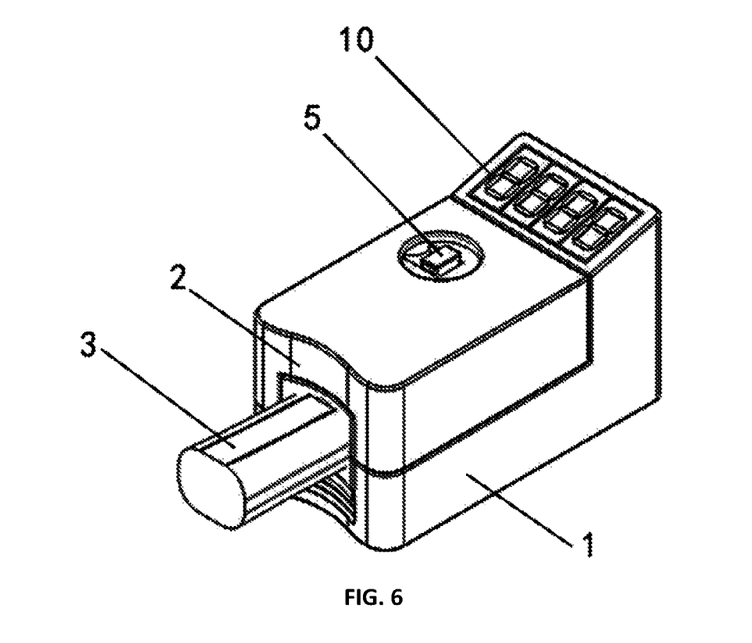
FIG. 6 illustrates a schematic structural diagram of the capillary blood collecting device according to the embodiment of the present disclosure with a single-needle skin puncture part.
Figure 7:
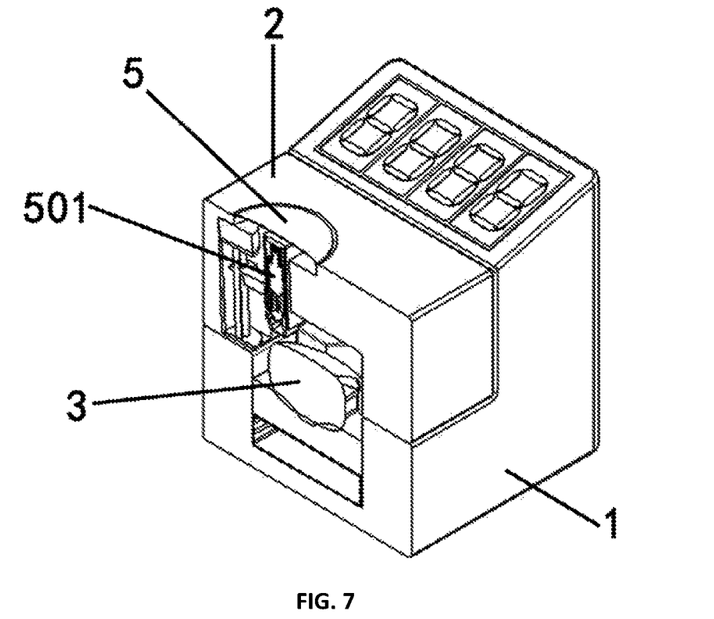
FIG. 7 illustrates a cross-sectional view of the capillary blood collecting device according to the embodiment of the present disclosure with the single-needle skin puncture part.

Further, the capillary blood collecting device is configured to detachably accommodate at least one skin puncture part 5 on the blood collection side of the finger 3. The skin puncture part 5 includes a blood lancet 501 that can be driven to perform puncturing on the finger 3. It can be understood that the skin puncture part 5 is set relative to the blood collection surface of the finger 3, and the blood lancet 501 of the skin puncture part 5 is driven to perform puncturing action on the finger 3 for which the blood has converged to the fingertip, so that the finger 3 quickly bleeds capillary blood. The above-mentioned skin puncture part 5 may adopt a single-needle skin puncture part in the prior art, as shown in FIGS. 6 and 7, and thus needs to be manually replaced with a new skin puncture part 5 after each use. Besides, the skin puncture part 5 also may adopt a multiple-needles skin puncture part, as shown in FIGS. 1 and 5. The multiple-needles skin puncture part may be placed into the fixing device 100 and the used lancet 501 may be automatically replaced with an unused lancet 501 for the next blood collection after measurement is completed for each time, which is not specifically limited by this application, as long as the blood lancet 501 in the skin puncture part 5 may be driven to automatically complete the puncturing action.

Figure 11:
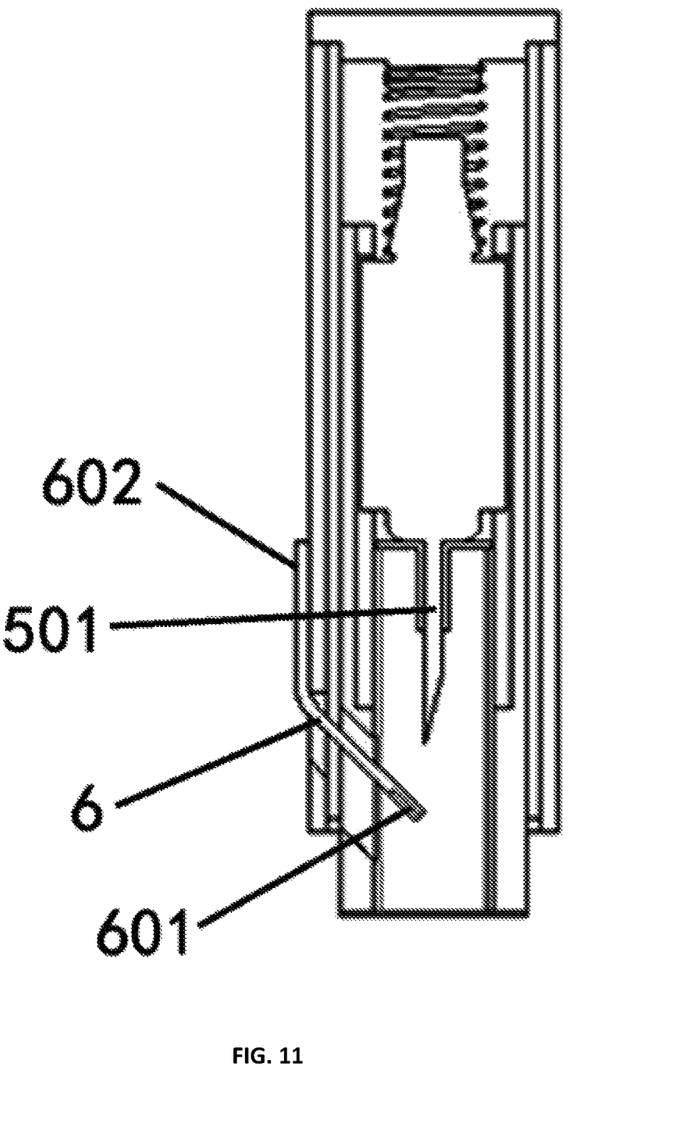
FIG. 11 illustrates a cross-sectional view of the skin puncture part of the capillary blood collecting device according to the embodiment of the present disclosure.

It can be understood that the above-mentioned skin puncture part 5 also includes a driving device (not shown in the figures) for driving the blood lancet 501 to puncture the finger 3. The above-mentioned driving device may include a driving motor and a gear assembly capable of rotating under the driving of the driving motor. The skin puncture part 5, including the blood lancet 501, may be driven to puncture the finger 3 by the driving motor driving the gear assembly to rotate. The above-mentioned gear assembly connected with the driving motor is only one embodiment of the present application, and the skin puncture part 5 including the blood lancet 501 can also be driven by means of a hydraulic or pneumatic driven rod to perform puncturing, which is not specifically limited in the present application. Besides, the driving device may include a spring. As an example, as shown in FIG. 11, a spring may be arranged inside the skin puncture part 5. In some embodiments, the spring may be triggered by the driving device then drive the blood lancet 501 to puncture the finger.

In the present disclosure, the fixing device 100 accommodates the finger 3, and is provided with a squeezing member 4 that pressurize the finger 3 to squeeze the blood of the finger 3 to the fingertip, which does not require manual squeezing operation by the user and is user-friendly. The above-mentioned capillary blood collecting device accommodates the skin puncture part 5 therein, and the blood lancet 501 of the skin puncture part 5 may automatically complete the puncturing action under being driven such that a sufficient amount of capillary blood quickly flows out from the fingertip where capillary blood converged under the action of blood lancet 501, which eliminates the need for a series of operations, such as manually kneading fingers, puncturing, and squeezing fingers to collect blood, as in the traditional fingertip blood collection method. In this way, it is possible to greatly reduce the complexity of the blood collection procedure, reduce the patient's psychological fear and physical pain, and avoid squeezing out tissue fluid that would affect the measurement results.

Figure 8:
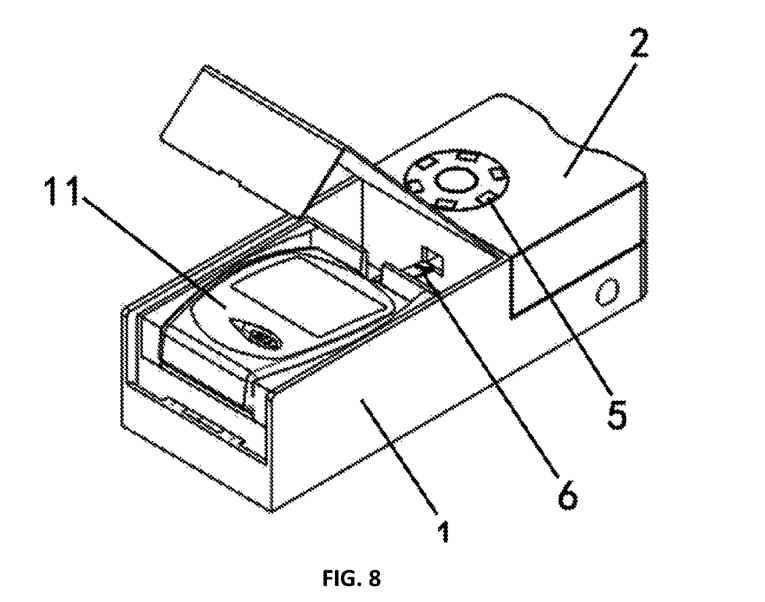
FIG. 8 illustrates a schematic structural diagram of the capillary blood collecting device according to the embodiment of the present disclosure with a measurement device and a test strip in the prior art.
Figure 9:
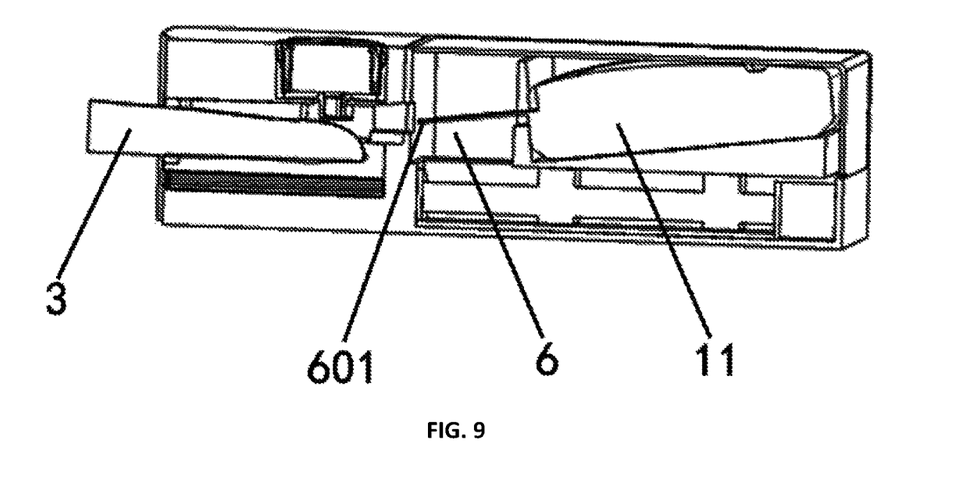
FIG. 9 illustrates a cross-sectional view of the capillary blood collecting device according to the embodiment of the present disclosure with the measurement device and the test strip in the prior art.

In some embodiments, as shown in FIGS. 8 and 9, the capillary blood collecting device is configured to accommodate the test strip 6 in a removable manner. The capillary blood collection tube 601 is provided on a side of the test strip 6 and is accommodated near the puncturing position of the finger 3 or may be fed to the vicinity of the puncturing position of the finger 3 for sucking blood. Wherein, the capillary blood collection tube 601 on the test strip 6 can quickly collect the outflowing capillary blood through the siphon effect. It should be understood by those skilled in the art that the above-mentioned test strip 6 and capillary blood collection tube 601 are members commonly used in the field of medical equipment technology for blood collection and blood detection.

It can be understood that, by collecting the capillary blood bleeding out from the fingertip of the finger 3 by the capillary blood collection tube 601 on the above-mentioned test strip 6, it is possible to collect the capillary blood directly without having to pull out the finger 3 and then make collection of capillary blood after the puncturing. In this manner, it may prevent the outflowing capillary blood from contaminating the blood collection environment in the accommodating cavity. In addition, the setting position of the test strip 6 is also convenient for the capillary blood collection tube 601 on the test strip 6 to collect blood. For example, the test strip 6 may be set in the skin puncture part 5 in an integrated manner relatively close to the puncturing position of the finger 3 or fed to the vicinity of the puncturing position as the blood collection action of the blood lancet 501. As another example, the test strip 6 is set on the first body 1 or the second body 2 relatively close to the puncturing position, so as to facilitate blood collection.

In some embodiments, continuing with reference to FIGS. 8 and 9, the capillary blood collecting device is configured to accommodate the measurement device 11 in a removable manner. Those skilled in the art can understand that the above-mentioned measurement device 11 is an instrument commonly used in the technical field of medical equipment for measuring physiological parameters such as blood glucose and blood lipids. That is to say, the measurement device 11 in the prior art can be set in the capillary blood collecting device for measurement. The test strip 6 may be inserted into the measurement device 11 before use, the measurement device 11 is then fixed in the capillary blood collecting device, such as the fixing device 100, and is loaded with the skin puncture part 5. Upon performing fixing, pressurizing, and puncturing operations on the finger, when the bleeding volume meets the measurement requirements, the capillary blood collecting device automatically moves the test strip 6 to the vicinity of the puncturing point of the blood collection site, so that the capillary blood collection tube 601 may quickly collect blood through the siphon effect. After waiting for a few seconds, the measurement device 11 may give the measurement result and complete the measurement. Such capillary blood collecting device can be compatible with the common test strip 6 and measurement device 11 available on the market, thereby reducing the difficulty and cost of its promotion, and providing convenient automated measurement while reducing the pain and fear of patients.

In some embodiments, continuing in conjunction with FIGS. 8 and 9, the test strip 6 is provided with a conductive contact 602 (not shown in FIGS. 8 and 9) at its end away from the blood lancet 501, which is electrically connected to the measurement device 11 to obtain test results based on blood on test strip 6. It can be understood that, by electrically connecting the test strip 6 with the measurement device 11, it is possible to further increase the automation of the product and reduce the assembly difficulty of the product, and it is beneficial to integrate the measurement device 11 into the capillary blood collecting device in an embedded manner. Especially in the case of replacing the test strip 6, it is still possible to achieve reliable electrical connection between the test strip 6 and the embedded measurement device 11. It should be noted that both the measurement device 11 and the skin puncture part 5 in this embodiment can adopt products in the prior art in an integrated manner with the capillary blood collecting device. In the present application, by setting the conductive contact 602 electrically connected to the measurement device 11 on the test strip 6, the capillary blood collecting device can complete the automated measurement of the capillary blood collected by the capillary blood collection tube 601 on the test strip 6, and directly provide users with the final measurement results, which is more convenient for users to operate and use.

Figure 10:
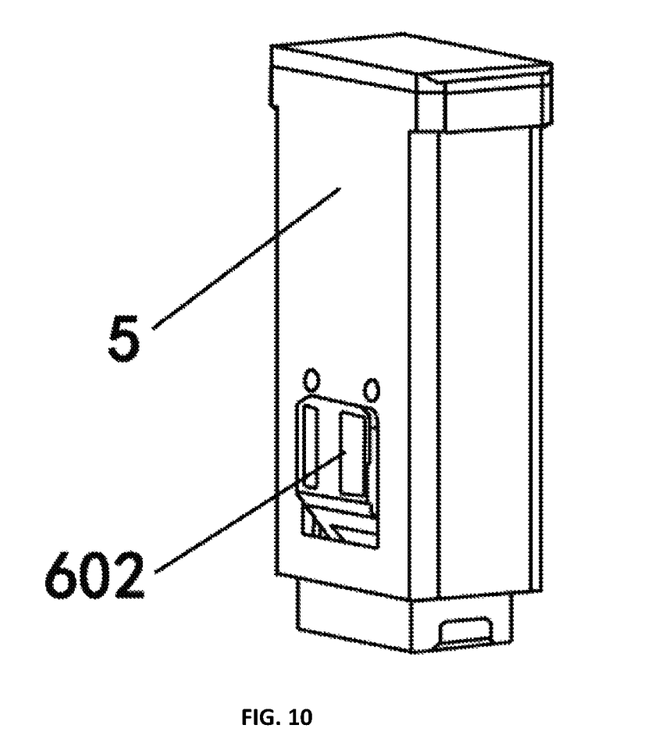
FIG. 10 illustrates a schematic structural diagram of the skin puncture part of the capillary blood collecting device according to the embodiment of the present disclosure.

In some embodiments, continuing with reference to FIG. 7, the capillary blood collecting device further includes the skin puncture part 5 and the test strip 6. The structure of the skin puncture part 5 is shown in FIGS. 7, 10 and 11, wherein one side of the test strip 6 is provided with the capillary blood collection tube 601, which is accommodated inside the skin puncture part 5 near the puncturing position for blood aspiration. It can be understood that the test strip 6 and the skin puncture part 5 adopt an integrated design, which can facilitate the removal of the skin puncture part 5 from the fixing device 100 after use. The other side of the test strip 6 is provided with the conductive contact 602, as shown in FIG. 10, the conductive contact 602 is provided outside the skin puncture part 5 to be electrically connected to the measurement device 11. Wherein, the measurement device 11 may be a conventional instrument in the prior art for measuring physiological parameters such as blood glucose and blood lipids. The exposed conductive contact 602 may be electrically connected to the measurement device 11 to measure the capillary blood collected by the capillary blood collection tube 601 of the test strip 6 by the measurement device 11, so that the capillary blood collecting device can not only automatically complete the collection of capillary blood, but also can accurately measure capillary blood, which is beneficial to simplify the complexity of the user's operation of monitoring the condition.

In some embodiments, the measurement device 11 may be integrated in the capillary blood collecting device (not shown in the figures), and be electrically connected to the conductive contact 602 so as to obtain test results based on the blood on the test strip 6. In this manner, the capillary blood collecting device may not only automatically collect the outflowing capillary blood, but also directly detect the capillary blood, which simplifies the complexity of the user's operation of monitoring the disease condition.

As shown in FIG. 1, the above-mentioned measurement device 11 (not shown in the figure) may be disposed in the first body 1 or the second body 2, which is not specifically limited in this application, as long as the product can be compact and reasonable in the structure and layout while ensuring the effective electrical connection between the measurement device 11 and the conductive contact 602.

In some embodiments, a portion of the test strip 6 provided with the capillary blood collection tube 601 is encapsulated inside the skin puncture part 5, as shown in FIG. 11. With the capillary blood collection tube 601 as a blood collection tool, it may ensure that the part of the capillary blood collection tube 601 encapsulated inside the skin puncture part 5 is kept in a sealed and dry condition. By encapsulating the capillary blood collection tube 601 inside the skin puncture part 5, it can effectively ensure that the test area of the test strip 6 is not oxidized due to contact with air, thereby ensuring the accuracy of the measurement results.

In some embodiments, the capillary blood collecting device further includes a prompt device 10, which is connected to the measurement device 11 and configured to issue prompt information based on the test result. Wherein, the prompt device 10 includes at least one or more of a visual prompt assembly and an audible prompt assembly. For example, when the above-mentioned measurement device 11 is a blood glucose measuring instrument, it can directly issue prompt sounds such as "normal" and "abnormal" when detecting that the user's blood glucose satisfies or exceeds the standard, so as to inform the user of his condition. The prompt device 10 shown in FIG. 1 may also be used, which includes a display screen for displaying the specific physiological parameter values for the user, so that the user may grasp his own health status in more detail, which is not specifically limited in this application. Besides, a suitable prompt device 10 may be provided for users according to market demands. Of course, a prompt device 10 that may provide both a visual prompt function and an audible prompt function may also be used, so that patients with poor vision or hearing can still obtain measurement results through the capillary blood collecting device.

Figure 2:
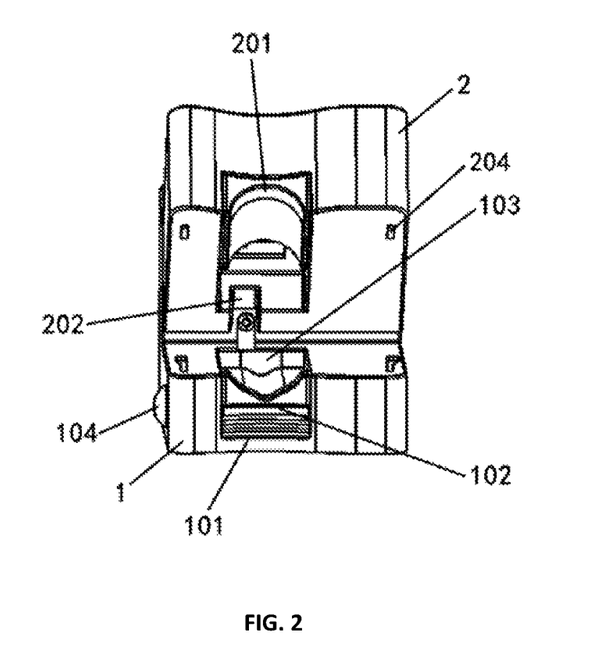

In some embodiments, as shown in FIG. 2, the capillary blood collecting device is provided with a tray 102 for supporting the finger 3, the radian of which is suitable for the outer contour surface of a human finger, so that the finger 3 may fit against the upper surface of the tray 102. A limiting mechanism 103 is provided in the tray 102 to limit the placement position and depth of the finger 3.

It can be understood that the limiting mechanism 103 includes a longitudinal limiting mechanism and a lateral limiting mechanism, wherein the longitudinal limiting mechanism may limit the entering depth of the finger 3, and the lateral limiting structure may limit the placement position of the finger, so that after the fingers 3 of patients with different diameters and lengths are placed in the accommodating cavity, the above-mentioned longitudinal limiting mechanism and lateral limiting mechanism may ensure that the positions of the blood collection points are controllable when collecting blood for different users.

In some embodiments, the squeezing member 4 is compliant so that its profile may conform to the contours of the finger. It can be understood that the squeezing member 4 is flexible at the side in contact with the finger 3, and has a shape and size adaptively adjustable according to the diameter and shape of the finger so as to adapt to the finger 3 of different sizes. Specifically, the squeezing member 4 may include an airbag and an air pump for inflating the airbag. The airbag inflates and squeezes the finger 3 in a working state, and thus may fit against and pressurize the finger 3 due to its compliance, so as to ensure that the squeezing member 4 fits tightly with the finger and applies pressure evenly. The above-mentioned airbag and air pump only serve as an embodiment, and structures capable of flexible deformation and applying a certain external force in the prior art may be used as well. Those skilled in the art can select a structure capable of realizing the above functions according to design requirements.

It can be understood that the above compliance means that the squeezing member 4 has strong surface deformation ability and may cause a large deformation by applying a small external force. In some embodiment, it specifically means that the squeezing member 4 may flexibly fit against the surface of the finger 3, that is, deform adaptively following the outer contour of the finger.

Figure 3:
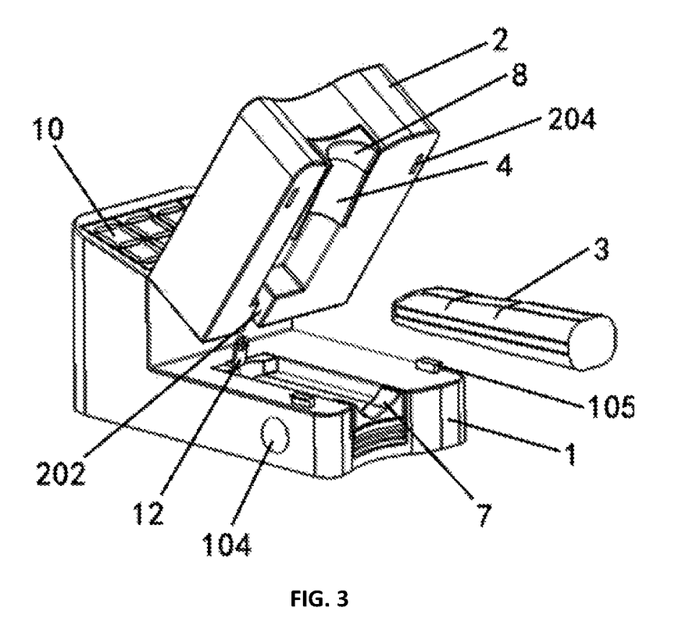
Figure 4:
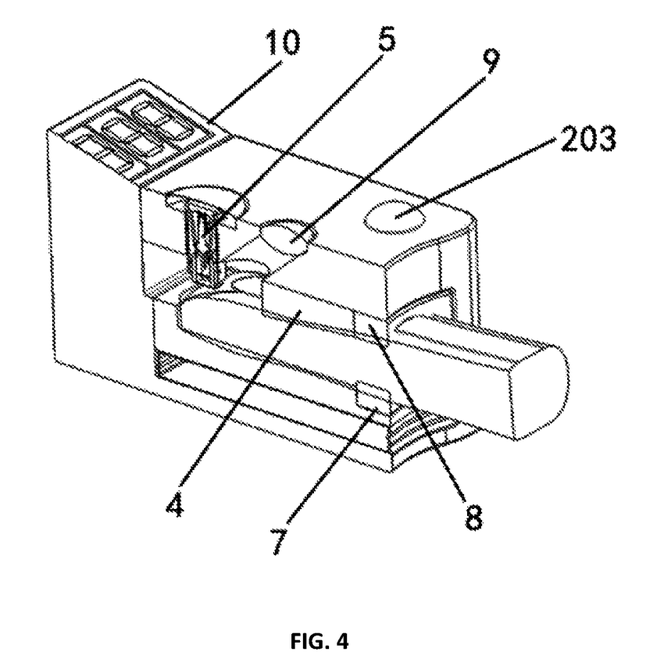

In some embodiments, the squeezing member 4 is disposed in the fixing device 100, and the capillary blood collecting device further includes a block member disposed in the fixing device 100 away from the skin puncture part 5 with respect to the squeezing member 4, so as to prevent the blood in the finger 3 from flowing back to the root when the squeezing member 4 applies pressure. It can be understood that, when the fixing device 100 is in an integrated design, the body of the fixing device 100 is integrally provided with the above-mentioned block member to ensure the integrated design of the product. Further, when the fixing device 100 is a detachable design, as shown in FIGS. 3 and 4, the above-mentioned block member may include a first block member 7 disposed on the first body 1 and a second block member 8 disposed on the second body 2 (as shown in FIGS. 3 and 4), wherein the first block member 7 and the second block member 8 are disposed opposite to each other and away from the skin puncture part 5 with respect to the squeezing member 4. That is, after the user places the finger 3 in the accommodating cavity, the first block member 7 and the second block member 8 are respectively towards the root of the finger 3, which can clamp the root of the finger relatively closely to effectively prevent the blood in the finger 3 from flowing back to the root when the squeezing member 4 applies pressure. As shown in FIGS. 3 and 4, the side, adhering to the surface of the finger 3, of the first block member 7 and the second block member 8 is arc-shaped, so as to apply pressure to the root of the finger under the condition that it is closely fitted against the root of the finger 3.

Further, the capillary blood collecting device further includes an actuating mechanism, which is configured to actuate the block member to apply pressure to the root of the finger, and then actuate the squeezing member 4 to perform squeezing. It can be understood that, in order to prevent the squeezing member 4 from squeezing the blood to the root of the finger instead of the fingertip, the block member is firstly actuated by the actuating mechanism to clamp the root of the finger 3 closely, and then the squeezing member 4 is actuated to squeeze the finger 3, so that the blood of the finger converges to the fingertip. For example, as shown in FIGS. 3 and 4, when the fixing device 100 is a detachable design, that is, when the block member includes the first block member 7 and the second block member 8, the squeezing member 4 may include an air bag and an air pump. The first block member 7 and the second block member 8 may also be powered by the same air pump as described above. The air bag of the above-mentioned squeezing member 4 serves as a downstream air bag, while the first block member 7 and the second block member 8 respectively comprise an upstream air bag. The solenoid valve electrically connected to the air pump first actuates the air pump to inflate the upstream air bag, so that the latter applies pressure to the root of the finger 3, and then inflates the downstream air bag so that the blood of the squeezed finger converges to the fingertip, so as to effectively prevent the backflow of blood to the root of the finger and avoid negative effect on blood collection. The above embodiment is only a solution in which the squeezing member 4, the first block member 7 and the second block member 8 of the present application may prevent the backflow of blood. The specific structures of the squeezing member 4, the first block member 7 and the second block member 8 in the embodiments of the present application are not limited to this, and those skilled in the art may select a structure capable of realizing the above functions according to design requirements.

In some embodiments, the capillary blood collecting device further includes: a pressure sensor (not shown in the figures) configured to monitor the pressure value applied by the squeezing member 4; a micro-processing unit (not shown in the figures) configured to send a stop pressurization signal to the squeezing member 4 when the pressure value reaches a second threshold value. It can be understood that, in order to facilitate the pressure sensor to detect the pressure, the pressure sensor may be provided close to the squeezing member 4. When the pressure sensor detects that the pressure applied by the squeezing member 4 on the finger 3 reaches the set second threshold, the micro-processing unit sends the stop pressurization signal to the squeezing member 4 in time, and maintains the output pressure of the squeezing member 4 constant, thereby preparing for the subsequent puncturing and blood collection. It should be noted that when the pressure output by the squeezing member 4 is too high, the finger 3 will seep too much blood, and even tissue fluid may seep out with the blood, therefore affecting the accuracy of the measurement results; when the pressure output from the squeezing member 4 is too low, the bleeding volume may be insufficient, resulting in a failed blood collection and a new blood collection. With the above-mentioned pressure sensor and micro-processing unit, the problem that the applied pressure of the squeezing member 4 is too high or too low can be effectively prevented.

In some embodiments, a blood collection port 202 (as shown in FIG. 2) through which the blood lancet 501 may pass is opened in a lower part of the skin puncture part 5, and the lower direction of the skin puncture part 5 refers to the direction of one side of the skin puncture part 5 close to the accommodating cavity. The blood collection port 202 is set at a position where the blood lancet 501 may pass through, so that the blood lancet 501 extending into the accommodating cavity may puncture the finger 3. Further, the blood collection port 202 is set at a deviation to left/right position on the blood collection side of the finger 3. It can be understood that the nerve endings of the finger are abundant. If blood is taken from the middle of the fingertip, the nerve endings of the ulnar nerve and the median nerve will be stimulated at the same time, which will cause more pain. If blood is taken from the ulnar side of the fingertip, only the ulnar nerve endings will be involved, which will cause less pain because of less influence. Therefore, by causing the blood lancet 501 to collect blood from the blood collection port 202 at a deviation to left/right position on the blood collection side of the finger 3, it is possible to reduce the pain of the patient as much as possible and to reduce the fear of the patient at the time of blood collection, effectively improving user's experience.

In addition, after the blood collection site is punctured, redundant bleeding volume may contaminate the capillary blood collecting device while insufficient bleeding volume may cause the measurement to fail. In order to ensure that the bleeding volume during blood collection is appropriate, a blood amount detection mechanism may be set in the capillary blood collecting device, which may be a manual observation type or an automatic detection type.

In some embodiments, when the blood volume detection mechanism adopts an automatic detection type, referring to FIG. 3, the capillary blood collecting device further includes a blood volume detection sensor 12, which is configured to detect the bleeding amount out of finger after the puncturing. The blood volume detection sensor 12 is preferably set close to the blood collection point of the finger 3, so as to detect the bleeding volume in time after the finger 3 bleeds. The capillary blood collecting device further comprises a micro-processing unit configured to send a pressure release signal to the squeezing member 4 when the bleeding volume reaches the first threshold.

It can be understood that when the bleeding volume reaches the first threshold, the squeezing member 4 may automatically release the pressure applied to the finger under the control of the micro-processing unit, so that the blood does not exude any more. On the contrary, if the blood volume detection sensor 12 does not detect that the blood volume reaches the first threshold value after a period of time, it will send a blood collection failure prompt message, and then the micro-processing unit will send a pressure release signal to the squeezing member 4, reminding the patient to replace the finger 3 to restart the blood collection and measurement. In this way, it may ensure that the bleeding volume is controlled in time under the condition that the bleeding volume may meet the measurement requirements, and the user may be notified of blood collection failure to restart blood collection when the bleeding amount of blood is insufficient.

In some embodiments, when the blood volume detection mechanism adopts a manual observation type, the capillary blood collecting device is provided with an observation window 9 for observing the bleeding volume of the finger 3. It can be understood that, as shown in FIG. 1, when the fixing device 100 is of a detachable design, the observation window 9 may be provided on the second body 2 of the fixing device 100, but the above is only one embodiment of the present application. The setting position of the observation window 9 is not specifically limited in this application, as long as it is convenient for the user to observe the bleeding volume of the finger. Through the observation window 9, the user observes the bleeding volume of the finger after pricking the finger with blood lancet 501. When the user determines that the bleeding volume has met the detection requirements, the blood collection work may stop for a user to visually check. Such observation mechanism is simple in structure and low in cost.

In some embodiments, the capillary blood collecting device further includes a pressure release button 203, which is electrically connected to the squeezing member 4 to release the pressure applied by the squeezing member 4. It can be understood that the user may observe the blood collection status through the observation window 9, so that when the bleeding volume meets the requirement, the user may manually press the pressure release button 203 to stop the squeezing member 4 so as to stop bleeding in time. On the contrary, when the user observes through the observation window 9 that the bleeding volume of the finger 3 is insufficient for a period of time, the finger 3 may be released by pressing the pressure release button 203 to replace the finger and restart blood collection.

In some embodiments, when the fixing device 100 adopts a detachable design, the fixing device 100 includes a first body 1 and a second body 2. As shown in FIGS. 1 to 3, a free end of the first body 1 and a free end of the second body 2 are engaged to each other, the free end of the first body 1 is provided with a slidable first bayonet coupling 105 (as shown in FIG. 3), and the free end of the second body 2 is provided with a second bayonet coupling 204 that is snapped to the first bayonet coupling 105 (see FIGS. 2 and 3). After the user places the finger 3 within the accommodating cavity, the first bayonet coupling 105 snapped the second bayonet coupling 204, so as to confine the finger 3 within the accommodating cavity. The first body 1 is also provided with an unlocking button 104 that may drive the first bayonet coupling 105 to slide (see FIGS. 2 and 3), which is disposed on the outer wall of the first body 1, so that when the unlocking button 104 is pressed, the first bayonet coupling 105 is slidably separated from the second bayonet coupling 204. In this way, after blood collection is finished or blood collection fails, the user may release the finger 3 from the accommodating cavity by squeezing the unlocking button 104. The specific structures of the first bayonet coupling 105 and the second bayonet coupling 204 are not limited as long as they can be stably snap each other, and those skilled in the art can adopt structures that can realize the above functions as needed according to design requirements.

Figure 12:
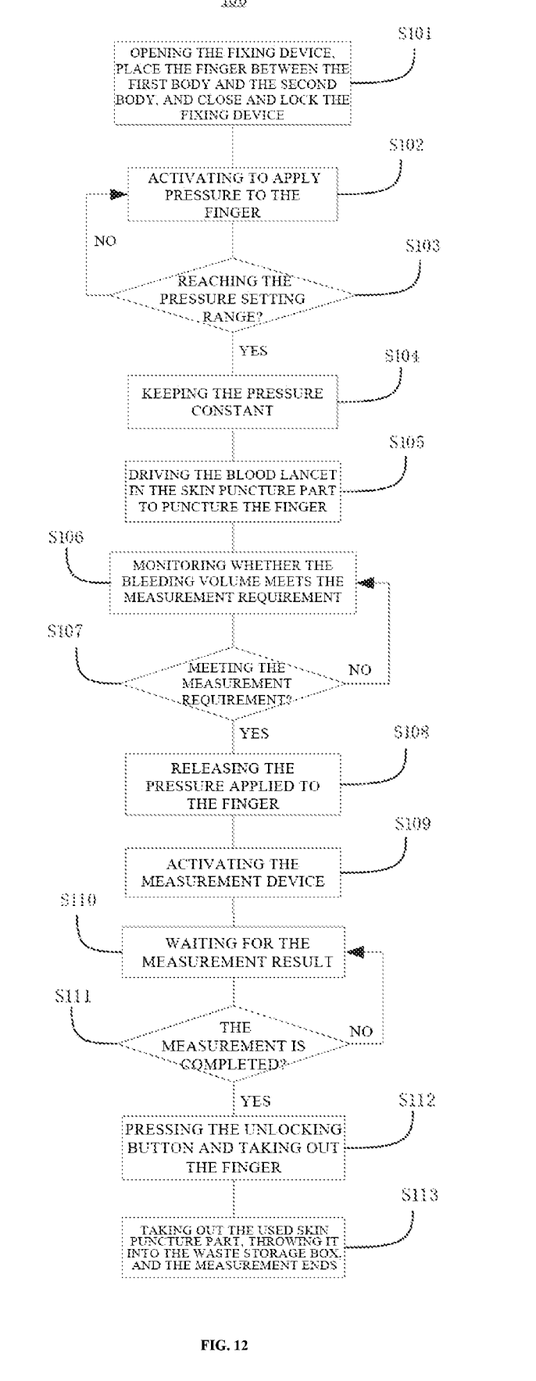
FIG. 12 illustrates an operation flowchart of the capillary blood collecting device according to the embodiment of the present disclosure.

FIG. 12 is an operation flowchart of a capillary blood collecting device according to an embodiment of the present disclosure. Referring to FIG. 12, the operation flow of the capillary blood collecting device provided by the embodiment of the present disclosure is described. When the capillary blood collecting device is used, if the fixing device 100 adopts a detachable design, the fixing device 100 is firstly opened, the finger 3 is placed between the first body 1 and the second body 2, and then the fixing device 100 is closed and locked (S101). The squeezing member 4 is activated to apply pressure to the finger 3 (S102). When it is determined that the pressure applied to the finger 3 by the squeezing member 4 reaches the pressure setting range (S103), the output pressure is kept constant (S104). If the pressure does not reach the pressure setting range, step S102 is continued, that is, the squeezing member 4 continues to apply pressure to the finger 3. After performing step S104, the blood lancet 501 in the skin puncture part 5 is driven to puncture the finger 3 and complete blood collection (S105). At this time, the fingertip of the finger 3 is punctured to bleed, and then it is monitored whether the bleeding volume meets the measurement requirement (S106). If the measurement requirement is met (S107), the pressure applied to the finger 3 is released (S108). If the bleeding volume does not meet the measurement requirement, the continuously bleeding finger is continuously monitored, that is, step S106 is continued. After the pressure applied to the finger 3 is released, the measurement device 11 is activated (S109), so that the user may wait for the measurement result of the measurement device 11 (S110). After the measurement is completed (S111), the unlocking button 104 is pressed to take out the finger 3 (S112). Finally, the used skin puncture part 5 is taken out and thrown into the waste storage box, and the measurement is completed (S113). If the measurement is not completed, the system continues to wait for the measurement result (S110).

In addition, although exemplary embodiments have been described herein, the scope thereof includes any and all embodiments based on the present disclosure having equivalent elements, modifications, omissions, combinations (e.g., scenarios where various embodiments intersect), adaptations, or changes. The elements of the claims will be construed broadly based on the language employed in the claims and are not limited to the examples described in this specification or during implementation of this application, the examples of which will be construed as non-exclusive. Accordingly, this specification and the examples are intended to be considered as examples only and the true scope and spirit is indicated by the full scope of the following claims and their equivalents.

The above-mentioned description is intended to be illustrative and not limiting. For example, the above-mentioned examples (or one or more embodiments thereof) may be used in combination with each other. For example, those of ordinary skill in the art may use other embodiments when reading the above-mentioned description. In addition, in the above-mentioned specific embodiments, various features may be grouped together to simplify the present disclosure. This should not be interpreted as an intention that features of the disclosure that are not claimed are necessary for any of the claims. Rather, the subject matter of the present disclosure may have less features than the features of a particular disclosed embodiment. Thereby, the following claims are incorporated herein as examples or embodiments in the particular embodiment, wherein each claim stands alone as a separate embodiment, and it is contemplated that these embodiments may be combined with each other in various combinations or permutations. The scope of the present disclosure shall be determined by reference to the full scope of the appended claims and equivalent forms of these claim assignments.

The above-mentioned embodiments are only exemplary embodiments of the present disclosure, and are not used to limit the present disclosure. The scope of protection of the disclosure is defined by the claims. Those skilled in the art can make various modifications or equivalent substitutions to the disclosure within the essence and protection scope of the disclosure, and such modifications or equivalent substitutions should also be regarded as falling within the protection scope of the disclosure.

What is claimed is:

1. A capillary blood collecting device, comprising:
   a fixing device including a first body and a second body pivotally connected, an accommodating cavity for accommodating a finger, for which blood-collection is to be performed, and a squeezing member for squeezing blood to a fingertip site, wherein the capillary blood collecting device is configured to detachably accommodate at least one skin puncture part on a side of the finger from which the blood-collection is to be performed, and the skin puncture part includes a blood lancet that is drivable to puncture the finger;
   a block member provided in the fixing device and away from the skin puncture part with respect to the squeezing member, so as to prevent blood in the finger from flowing back to a root of the finger upon pressurization by the squeezing member, the block member including a first block member disposed on the first body and a second block member disposed on the second body, the first block member and the second block member being disposed opposite to each other; and
   an actuating mechanism configured to actuate the first block member and the second block member first to clamp the root of the finger to pressurize the root of the finger, and then actuate the squeezing member to perform the squeezing.

2. The capillary blood collecting device of claim 1, wherein the capillary blood collecting device is configured to detachably accommodate a test strip, which is provided with a capillary blood collection tube on one side and is accommodated in or deliverable to the vicinity of a puncturing position of the finger, so as to aspirate blood.

3. The capillary blood collecting device of claim 2, wherein the capillary blood collecting device is configured to detachably accommodate a measurement device, the test strip is provided with a conductive contact at one end away from the blood lancet, and the conductive contact is electrically connected to the measurement device to obtain a test result based on the blood on the test strip.

4. The capillary blood collecting device of claim 3, wherein the capillary blood collecting device further includes a prompt device, which is connected to the measurement device and configured to deliver prompt information based on the test result.

5. The capillary blood collecting device of claim 4, wherein the prompt device includes at least one or more of a visual prompt assembly and an audible prompt assembly.

6. The capillary blood collecting device of claim 1, wherein the skin puncture part and a test strip, is provided with a capillary blood collection tube on one side and is accommodated in the vicinity of a puncturing position inside the skin puncture part so as to aspirate blood, and is provided with a conductive contact on the other side, wherein the conductive contact is provided outside the skin puncture part so as to be electrically connected to a test device.

7. The capillary blood collecting device of claim 6, wherein the test strip and the skin puncture part adopt an integrated design, and a part of the test strip provided with the capillary blood collection tube is encapsulated inside the skin puncture part.

8. The capillary blood collecting device of claim 6, wherein the capillary blood collecting device further includes a measurement device, and the conductive contact is electrically connected to the measurement device to obtain a test result based on the blood on the test strip.

9. The capillary blood collecting device of claim 8, wherein the capillary blood collecting device further includes a prompt device, which is connected to the measurement device and configured to deliver prompt information based on the test result.

10. The capillary blood collecting device of claim 1, wherein the capillary blood collecting device is provided with a tray for supporting the finger, and a limiting mechanism is provided in the tray to limit a placement position and depth of the finger.

11. The capillary blood collecting device of claim 1, wherein the squeezing member has compliance so that its shape is adapted to the contour of the finger.

12. The capillary blood collecting device of claim 1, wherein a blood collection port, through which the blood lancet passes, is opened in a lower part of the skin puncture part, and the blood collection port is set at a deviation to a left or right position of the finger on its blood-collection side.

13. The capillary blood collecting device of claim 1, wherein the capillary blood collecting device further includes:
a blood volume detection sensor, which is configured to detect a bleeding volume of the finger after puncture; and
a micro-processing unit, which is configured to send a pressure release signal to the squeezing member when the bleeding volume reaches a first threshold.

14. The capillary blood collecting device of claim 1, wherein the capillary blood collecting device is provided with an observation window for observing a bleeding volume of the finger.

15. The capillary blood collecting device of claim 14, wherein the capillary blood collecting device further includes a pressure release button, which is electrically connected to the squeezing member to release the pressure applied by the squeezing member.

16. The capillary blood collecting device of claim 1, wherein the capillary blood collecting device further includes:
a pressure sensor, which is configured to monitor a pressure value applied by the squeezing member; and
a micro-processing unit, which is configured to send a pressurization stop signal to the squeezing member when the pressure value reaches a second threshold value.

17. The capillary blood collecting device of claim 1, wherein the skin puncture part further comprises a driving device for driving the blood lancet to puncture the finger.

* * * * *